US012719899B2

(12) United States Patent
Bolturk et al.

(10) Patent No.: US 12,719,899 B2
(45) Date of Patent: Aug. 25, 2026

(54) SYSTEMS AND METHODS FOR USE IN ASSESSMENTS IN CONNECTION WITH CYBER ATTACKS

(71) Applicant: MASTERCARD INTERNATIONAL INCORPORATED, Purchase, NY (US)

(72) Inventors: Eda Bolturk, Istanbul (TR); Eran Yaniv, Holon (IL); Keren Gabber, Tel Aviv (IL)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 57 days.

(21) Appl. No.: 18/586,982

(22) Filed: Feb. 26, 2024

(65) Prior Publication Data

US 2025/0274463 A1 Aug. 28, 2025

(51) Int. Cl.
*H04L 9/40* (2022.01)
*G06Q 10/0635* (2023.01)
*G06Q 10/0637* (2023.01)

(52) U.S. Cl.
CPC ..... *H04L 63/1425* (2013.01); *G06Q 10/0635* (2013.01); *G06Q 10/06375* (2013.01)

(58) Field of Classification Search
CPC ............ H04L 63/1425; G06Q 10/0635; G06Q 10/06375
See application file for complete search history.

(56) References Cited

U.S. PATENT DOCUMENTS 9,426,169 B2 8/2016 Zandani
9,537,881 B2 1/2017 Zandani et al.
(Continued)

FOREIGN PATENT DOCUMENTS

KR 20090037538 A 4/2009
KR 20160004791 A 1/2016
(Continued)

OTHER PUBLICATIONS

Hajizadeh et al., "Probability Analysis of Successful Cyber Attacks in SDN-based Networks," 2018 IEEE Conference on Network Function Virtualization and Software Defined Networks (NFV-SDN) Year: 2018 | Conference Paper | Publisher: IEEE.*
(Continued)

*Primary Examiner* — Roderick Tolentino
(74) *Attorney, Agent, or Firm* — Harness, Dickey & Pierce, P.L.C.

(57) ABSTRACT

Systems and methods are provided for assessing cyber attack preparedness associated with organizations. One example computer-implemented method includes accessing data indicative of multiple controls of an organization, where the organization includes an information network, which includes the controls and where the controls are associated with securing one or more information assets. The data is indicative of the controls including multiple indicators. The method also includes aggregating one or more ratings for at least one of the indicators to a criteria, aggregating the aggregate rating for the criteria to a category, and aggregating the aggregate rating for the category to one of the controls as a control maturity score for said one of the controls. The method then includes displaying the control maturity score for said one of the controls to a first user associated with the organization.

17 Claims, 6 Drawing Sheets

(56) References Cited

U.S. PATENT DOCUMENTS

| | | | | |
|---|---|---|---|---|
| 9,888,027 | B2 | 2/2018 | Zandani et al. | |
| 9,930,061 | B2 * | 3/2018 | Zandani | H04L 63/1425 |
| 10,320,829 | B1 | 6/2019 | Banga et al. | |
| 10,599,837 | B2 * | 3/2020 | Chari | G06F 21/552 |
| 10,637,883 | B1 * | 4/2020 | Segal | H04L 63/1433 |
| 10,834,087 | B1 * | 11/2020 | Pillai | G06F 11/3476 |
| 10,997,532 | B2 * | 5/2021 | Govindugari | G06F 16/2219 |
| 11,734,636 | B2 | 8/2023 | Harry et al. | |
| 12,008,657 | B2 | 6/2024 | Parient et al. | |
| 12,028,380 | B2 | 7/2024 | Gamra | |
| 12,169,569 | B2 | 12/2024 | Belfiore, Jr. et al. | |
| 2015/0370801 | A1 * | 12/2015 | Shah | G06Q 30/0282 707/728 |
| 2016/0112445 | A1 | 4/2016 | Abramowitz | |
| 2016/0197953 | A1 | 7/2016 | King-Wilson | |
| 2016/0241561 | A1 * | 8/2016 | Bubany | H04L 63/1433 |
| 2017/0124579 | A1 | 5/2017 | Crabtree et al. | |
| 2018/0048669 | A1 | 2/2018 | Lokamathe et al. | |
| 2019/0207981 | A1 * | 7/2019 | Sweeney | H04L 41/145 |
| 2020/0167705 | A1 | 5/2020 | Risoldi et al. | |
| 2020/0311630 | A1 | 10/2020 | Risoldi et al. | |
| 2021/0142791 | A1 * | 5/2021 | Penta | G10L 15/1815 |
| 2022/0210202 | A1 | 6/2022 | Crabtree et al. | |
| 2023/0137325 | A1 * | 5/2023 | Kito | G06F 21/577 726/23 |
| 2023/0239327 | A1 * | 7/2023 | Haruki | H04L 63/1433 726/1 |
| 2024/0179185 | A1 | 5/2024 | Crabtree et al. | |
| 2024/0314158 | A1 | 9/2024 | Bourzikas | |
| 2024/0346424 | A1 | 10/2024 | Orzechowski et al. | |
| 2024/0388598 | A1 | 11/2024 | Cartan et al. | |

FOREIGN PATENT DOCUMENTS

| | | |
|---|---|---|
| WO | WO2016/109608 | 7/2016 |
| WO | WO2021/216307 | 10/2021 |
| WO | WO-2023052728 A1 | 4/2023 |
| WO | WO2023/076482 | 5/2023 |

OTHER PUBLICATIONS

Kim et al., "Study on Cyber Attack Damage Assessment Framework," IEEE Access Year: 2022 | vol. 10 | Journal Article | Publisher: IEEE.*

"The FAIR Model"; https://www.fairinstitute.org/blog/fair-model-on-a-page); web accessed Sep. 16, 2023; 1 page.

"NIST Cyber Risk Scoring"; https://csrc.nist.gov/CSRC/media/Presentations/nist-cyber-risk-scoring-crs-program-overview/images-media/NIST%20Cyber%20Risk%20Scoring%20(CRS)%20-%20Program%20Overview.pdf); Feb. 20, 2021; 38 pgs.

"RiskLens—NIST CSF and FAIR"; https://www.risklens.com/cyber-risksolutions/nist-csf-fair; Sep. 16, 2013; 5 pgs.

* cited by examiner

SYSTEMS AND METHODS FOR USE IN ASSESSMENTS IN CONNECTION WITH CYBER ATTACKS

FIELD

The present disclosure generally relates to systems and methods for effecting assessments in connection with attack preparedness (e.g., for preparedness against cyber attacks, etc.).

BACKGROUND

This section provides background information related to the present disclosure, which is not necessarily prior art.

Networks are known to be accessed for a variety of different reasons. Often, access to the networks is consistent with the purposes of the networks, for example, to access services, to retrieve information, to post information, etc. Occasionally, attempts to access the networks are consistent with nefarious purposes, such as, for example, cyber attacks. Cyber attacks may include unauthorized attempts to access computers, etc. Example cyber attacks include malware attacks, phishing attacks, password attacks, man-in-the-middle attacks, etc. Networks often include various hardware and software components, which aim to eliminate, or at least limit, these cyber attacks and the potential for success of such cyber attacks.

BRIEF DESCRIPTION OF DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

The description and specific examples included herein are intended for purposes of illustration only and are not intended to limit the scope of the present disclosure.

Systems provided by organizations are often protected from cyber attacks through various forms of hardware and software, i.e., referred to herein as controls, which are designed to prevent the attacks, limit the impact of the attacks, or prevent one or more aims of the attacks (e.g., to disrupt, destroy or control computer systems or to alter, delete, manipulate or steal data, etc.). Often, decision-makers associated with the various forms of controls weigh cost of implementation against not only efficacy of the controls, but also the potential risk associated with the cyber attacks. Unfortunately, especially for larger organizations, sizes of the systems in terms of number of users, applications, services, locations, cloud services, third-party vendors, and hybrid environments, etc., make it difficult (if not impossible) to provide accurate assessments of not only the preparedness of the networks with respect to, but also potential financial impact of, cyber attacks. That is, organizations need to understand their cyber preparedness postures and potential impact (e.g., based on confidentiality, integrity, availability of impact to assets, etc.) caused by possible cyber attacks, or cyber events. In addition, decision makers want to understand the potential financial loss in dollar (or other suitable currencies) amounts of such cyber attacks.

Beyond the above, it is difficult to catch bad actors in the fast-changing conditions, i.e., in the ever-changing environment, that is the cyber security. Not only is the technology changing, in the organizations' networks, but also cyber attack actors continuously evolve raising new risks and vulnerabilities. As such, an up-to-date algorithm with correct coefficients and real time data is needed to accurately assess the real cyber posture or cyber risk of organizations.

Uniquely, the systems and methods herein provide for modeling preparedness (e.g., of organizations, etc.) for cyber attacks, and potentially, the financial losses associated with the cyber attacks. The modeling relies on identifying a threat landscape, cyber maturity status, and information assets.

Figure 1:
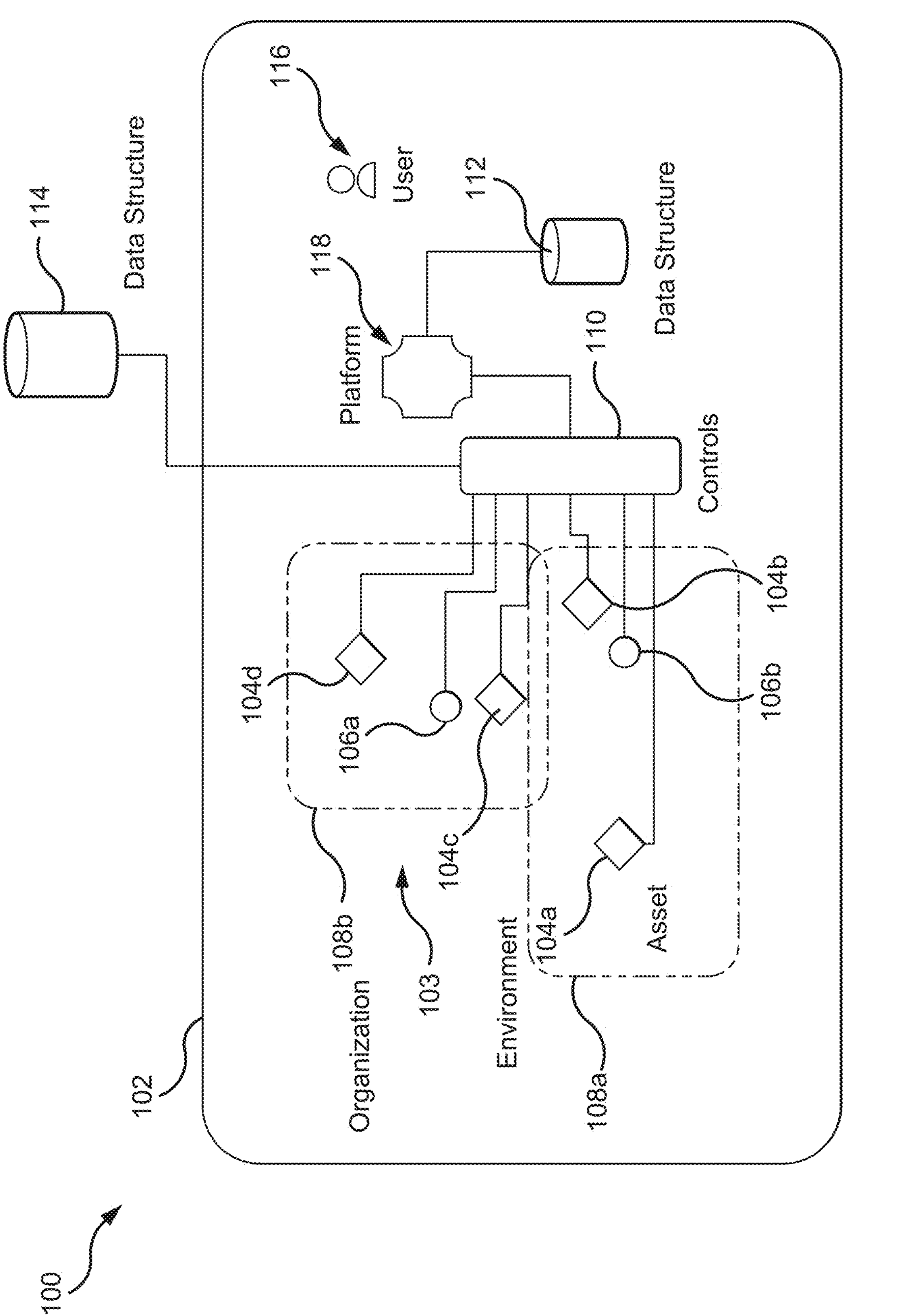
FIG. 1 is a block diagram of an example system of the present disclosure suitable for use in assessing cyber attack preparedness associated with organizations.

FIG. 1 illustrates an example system 100, in which one or more aspects of the present disclosure may be implemented. Although the system 100 is presented in one arrangement, other embodiments may include systems arranged otherwise within the scope of the present disclosure.

The system 100 includes an organization 102, which is configured to perform one or more services for users or customers of the organization 102. The organization 102 illustrated in FIG. 1 may refer to any organization, such as, for example, a corporation, a government, a non-governmental organization, an international organization, a charity, a not-for-profit, a partnership, a cooperative, a university, or a combination of the same (e.g., private, public, government, etc.). The service(s) of the organization 102 may be technology-based, or otherwise, but the organization 102 does include an information technology (IT) ecosystem, which supports the offering of the service(s). In connection therewith, for purposes of illustration, the organization 102 includes a network infrastructure 103 and various assets 104*a-d* (generally referred to herein as assets 104) and technologies 106*a-b* (generally referred to herein as technologies 106).

In this example embodiment, the assets 104 generally include business assets, or information assets, or also physical assets, etc. The assets 104 are of various types, such as, for example, organization confidential business information; customer financial information; brand reputation and trust; intellectual property (IP); customer personal identifying information (PII); supply-chain information; agreements and contracts; personnel information; customer-facing services; core business systems/processes; customer protected health information (PHI); physical equipment; and organization confidential financial information.

While only four assets 104 are illustrated in FIG. 1, it should be appreciated that any suitable number of assets, consistent with the description herein, may be part of the organization 102 in other embodiments. Also, it should be appreciated that other types of information assets, or other assets may be included in the organization 102 in other system embodiments.

That said, as it relates to the specific assets 104 above, the organization confidential business information refers to information and data whose disclosure may harm the business, including, for example, business plans, secret information on mergers and acquisitions, new product plans, etc. Customer financial information refers to monetary assets held in cash or a form suitable to be liquidated, such as, for example, stocks and savings accounts, bank accounts and credit card information. Brand reputation and trust refers to the organization 102 being reliable, credible, trustworthy and responsible for employees, customers, shareholders and financial markets. Intellectual property is a category of property that includes intangible creations of the human intellect, and primarily encompasses copyrights, patents, trademarks, trade secrets, and product designs.

Customer PII includes any information or set of information relating to a person that identifies such person or could be used to identify such person, including without limitation, a person's name, address, ID number, telephone number, email address or call data records, user-ids and passwords. Supply-chain information includes information related to suppliers, contractors, or vendors, which is confidentially maintained by the organization 102. Agreements and contracts include documentation of relationships between the organization 102 and any other organization/individual stipulating expectations and covenants between the two or more parties. The agreements may include service agreements, service definitions, contracts, SCRs, NDAs, etc.

The personnel information includes information about employees that is to be maintained confidential between the employees and the organization 102, as the employer. The specific information may include, without limitation, CVs, salary letters, references, personal sensitive information, disciplinary information, pension information, starter-mover-joiner processes, etc. Customer-facing services include the services provided to clients by the organization 102. The services generally are tied to the generation of revenue, or generating of value to the organization 102, when operational, or services which the organization 102 is obliged to provide to its client by law. The services may include, without limitation, online payments, online purchases, government services, support services, etc.

Core business systems may include software programs or suites of related programs, which are "mission critical" to the organization 102, so that the organization 102 functions continuously in order for a business or segment of a business to be successful. If the program(s) experiences even brief downtime, the negative consequences to the organization 102 are likely to be financial. In addition to lost productivity, failure of this type of program to function may also damage the business' reputation. Example programs may include, without limitation, customer-relationship management (CRM), enterprise resource planning (ERP), payment systems, etc.

Customer protected health information includes any information about health status, provision of health care, or payment for health care that is created or collected by a covered entity or business associate of the covered entity, and can be linked to a specific individual. Physical equipment includes hardware and physical equipment belonging to the organization 102 or its employees or used as part of the organization's business processes. The equipment may include, without limitation, laptops, devices, ATM machines, USB drives, etc. Organizational confidential financial information refers to digitized information about or related to the organization 102 that can be considered as the equivalent to money. This information can be resident on storage devices or in transmission over electronic channels, and may include, specifically, wired money transfers, credit card transactions, etc. Organization public information includes information about the organization 102 that is publicly available.

In addition to the assets 104, the technologies 106 of the organization 102 may include, without limitation, application development; data processing and storage; network, servers and systems; web services; employee internet access; control systems; mobile devices; workstations; and email services. The technologies 106, generally, are configured to provide an approach or access to the specific assets 104 of the organization. The technologies 106 may be an approach to one asset, or multiple assets, as shown in FIG. 1. Further, the technologies 106 are associated with priorities of the organization 102, where the access to such technologies 106 is prioritized, for example, based on customer demand, importance of the technology/assets, etc. The priority of the technologies 106 may be defined, for example, by an information technology (IT) manager 116 (broadly, a user), alone or with consultation with or direction from one or more others in the organization 102. In addition to priority, the technologies 106 are also each associated with an access level, which indicates a level of exposure of the technologies 106, and then also, in turn, the assets 104 approached through the technologies 106. Generally, the higher the access level, the higher the risk. Further, it should also be appreciated that while only two technologies 106 are illustrated in FIG. 1 (e.g., technology 106*a*, technology 106*b*, etc.), any suitable number of technologies, consistent with the description herein, may be part of the organization 102 in other embodiments.

Also, it should be appreciated that other types of technologies 106 may be included in the organization 102 in other system embodiments.

That said, as it relates to the above, the application development includes technologies 106 that contain internally developed applications/websites or custom applications/websites purchased by the organization 102. Data processing and storage includes technologies 106 that store and/or process sensitive data such as PII, PHI, IP, etc. Networks include network infrastructure 103 (e.g., routers, switches, cloud-based or similar, etc.). Servers and systems include the organization's server infrastructure, which includes, potentially, both physical and virtual resources, including a complete set of hardware and software. Web services include technologies 106 that are exposed to the Internet, providing online services (e.g., marketing or an e-commerce website, online government services, etc.). Employee Internet access includes technologies 106 that provide employees internet access. Industrial control systems include technologies that may include lines, climate control systems (HVAC), Uninterrupted Power Supply (UPS) systems/emergency power backup generators, fire extinguisher systems, etc. Mobile devices include technologies 106 that provide mobile connectivity for mobile devices, such as, laptops, smartphones, tablets, etc., while workstations include technologies 106 that are dedicated terminals or workstations for employee productivity (e.g., as related to email, enterprise applications, offices, etc.), etc. And, finally, email services include technologies 106 that provide e-mail services to employees of the organization 102.

As shown in FIG. 1, the assets 104 and technologies 106 are organized into environments 108, where the environments 108 may be specific to services or functions of the organization 102. In this embodiment, the assets 104 and technologies 106 are organized into two environments, 108*a-b*. As should be appreciated from FIG. 1, the environments 108 may include the same or different assets 104 and/or technologies 106. For example, as shown, the environment 108*a* includes assets 104*a-b* and technology 106*b*, while the environment 108*b* includes assets 104*b-d* and technology 106*a*. While the assets 104 and technologies 106 are separate and not shared between environments 108, it should be appreciated that the assets 104 and/or technologies 106 may be shared between environments in other embodiments. What's more, it should also be appreciated that the assets 104 and technologies 106 included in the organization 102 may be organized into different environments 108 in still other embodiments.

The specific assets 104 and technologies 106 included in the environment 108 often depend on the specific type and/or function of the environment 108. Example environments 108 may include, business units (e.g., marketing, human resources, sales, etc.), order fulfillment, customer billing, and credit card processing, etc. It should be appreciated that the order fulfillment may utilize various assets 104 (e.g., customer PII, customer-facing services, supply chain information, agreements, etc.), while customer billing may rely on some of the same assets 104, but also different assets 104 (e.g., customer financial information, etc.).

Further, it should be understood that the specific environment(s) 108 included in the organization 102 are generally specific to the one or more services offered by the organization 102 to its customers, etc.

With continued reference to FIG. 1, the organization 102 further includes controls 110, which are imposed on the assets 104. It should be appreciated that the organization 102 includes an information network, which includes both hardware and software, in which the assets 104 and technologies 106 are implemented. That is, for example, Customer PII may be stored in a server located at a facility of the organization, where the server is part of the information network. Likewise, network infrastructure 103 is included as part of the information network, where not only the routers and switches reside, but also the specific anti-virus and anti-malware tools are employed. The information network may be understood to include the hardware and/or software hosting, supporting, and/or underlying, etc., the technologies 106, as approaches to the assets 104.

The information network then includes the controls 110, which may include policies, systems/hardware, software, configurations, training, and analysis of the organization's network, etc. Policies, for example, may include a removable media policy (e.g., removable media barred, etc.), software updates, email policies, patch management, password rules, asset management (e.g., remote wipe, etc.), encryption requirements, etc., which may be imposed through human action and/or automatically, via the assets 104. Systems may include, without limitation, network intrusion detection and/or prevention systems, etc. Software may include, without limitation, asset management software, password management, anomaly detection, etc. Configurations may include, without limitation, application controls/whitelisting/blacklisting, email security settings, accessibility (e.g., eliminating access to specific webpages, etc.), user asset security, authentication, encryption, etc. Training may include, without limitation, training related to phishing, password sharing, email assessment (e.g., links, checking sender email addresses, etc.), physical asset security, dual authentication, threat awareness, policies, etc. And, further, analysis of the organization's network may include, without limitation, brand reputation and protection, network traffic anomaly detection, threat intelligence analysis, etc.

The controls 110, in this embodiment, are categorized as preventive, infrastructure, and detective, which may be used in one or more of the assessments described below. It should be appreciated that other categories of controls may be included in other embodiments.

The system 100 also includes an internal data structure 112 and an external data structure 114. The internal data structure 112 is included as part of the organization 102, while the external data structure 114 is external or separate from the organization 102. The data structures 112, 114 include data specific to the assessment of the organization 102, as further described below. Any data described with reference to the internal data structure 112 may also, or alternatively, be included in the external data structure 114, and vice versa.

Example data included in the data structure 112 may include, without limitation, configuration files associated with the assets 104, the technologies 106, and/or the controls 110 (and the network infrastructure 103) of the organization 102, revenues of the organization 102 (e.g., annual, monthly, etc.), industries of the organization 102, location and facility information for the organization 102, employee information (e.g., number of employees, organization charts, work locations of employees, salary of employees, etc.), etc. Similarly, example data included in the data structure 114, for example, includes reporting data related to cyber attacks. The reporting data may indicate, for example, cyber attack events and associated timing, targets, methodologies, actors and objectives, and also analytics related to the same. The analytics may include the frequency and/or activity level of cyber attack events, in general or by methodology, actor, etc. The reporting data may be collected and stored in the data structure 114, for example, from monitoring thousands of clear, deep and dark web CTI sources, etc.

In addition to the above, the organization 102 also includes the IT manager 116 (broadly, user), who is employed directly or through contract with the organization 102. In this example, the IT manager 116 is knowledgeable about the assets 104 and technologies 106 of the organization 102, and situated to participate, as needed, in the assessment described herein, and also to review and present findings to decision makers associated with resource allocation at the organization 102 (e.g., as it relates to remedial, prevention, or IT initiatives associated with the assets 104, the technologies 106, or more broadly, the organization 102; etc.).

In this example embodiment, the system 100 includes an assessment platform 118, which is configured to assess the organization 102 as it relates to cyber attacks and to predict the financial loss associated with the cyber attack(s).

In particular, the platform 118 may be a standalone computing device, or integrated, in whole or in part, with one or more assets 104 or technologies 106 of the organization 102. The platform 118 is configured to generate a control maturity assessment, assess the threat activity level, and determine a probability of success of attack by methodology, etc.

It should be appreciated that the platform 118 is configured to respond to one or more requests for assessment of the organization 102, which may be submitted by a user (e.g., an IT manager, etc.) associated with the organization 102. The user 116, often, aims to assess the preparedness of the organization 102 as it relates to cyber attacks, i.e., cyber risk assessment. The request may be manually provided from the user 116, or automated at one or more regular or irregular intervals.

Initially, in response to a request, in this example embodiment, the platform 118 is configured to perform a control maturity assessment for the controls 110 of the organization 102. In connection with the assessment, the platform 118 is configured to collect data relevant to the specific controls 110. The data may be collected automatically (e.g., by collecting configuration files, etc.), or through the IT manager 116. For example, the platform 118 may be configured to collect configuration files for the assets 104, from the data structure 112, which defines the topology, setup, etc., of the technologies 106 in place at the organization 102 and the settings thereof. The platform 118 may be configured to also capture policies, restrictions, rules, etc., and also to pursue validation of the specific policies, restrictions, rules, etc., related to the assets 104, etc.

As it relates to the IT manager 116, the platform 118 may be configured to submit questions to be answered. Example questions related to the assets 104 are illustrated in Table 1. The example questions are merely example in nature, and the questions posed to the IT manager 116 generally include various details about the assets 104 and technologies 106, sufficient to assess the same.

TABLE 1

| |
|---|
| To what extent are the asset management policy and procedures implemented in the organization to ensure proper inventory, maintenance, and protection of assets? |
| To what extent is employees' internet browsing secure against web-related threats? |
| To what extent does the organization follow a change management process to prevent unintentional adverse impacts on a system as a result of a change? |
| To what extent is data at rest encrypted to prevent unauthorized information disclosure? |
| To what extent are the privacy protection policy, procedures, and controls implemented to ensure that personal information is collected, processed, and stored according to privacy laws and regulations? |
| Does the organization use a centrally managed signature-based anti-malware technology to continuously monitor and defend each workstation and server? |
| Is the signature-based anti-malware tools' rule set and policy reviewed and updated regularly to prevent new threats? |
| Does the endpoint anti-malware prevent all known malware? |

Each of the questions illustrated in Table 1 may be posed to the IT manager 116, whereby the IT manager 116 provides a response in text, or selects from multiple answers displayed with the questions. In other examples, the IT manager 116 uploads files, etc., in response to questions from the platform 118. More generally, it should be understood that various forms of questions and/or answers may be employed to sufficiently inform the platform 118. It should be further appreciated that the automated collection of information related to the organization 102, and questioning the IT manager 116, may be combined for certain assets 104, technologies 106 or controls 110.

The data captured, collected and/or received includes various details about the organization 102, the assets 104, the technologies 106, the controls 110, etc. Further, it should be understood that the data captured, collected and/or received may be classified into two categories, generally, technical data from the automated collection (e.g., of configuration files, etc.) and question data from the interrogation of the IT manager 116 (e.g., from the question in TABLE 1).

In connection with the above, it should be further appreciated that assets 104 may be assigned priorities (e.g., low, medium, high, very high, etc.), where certain ones of the assets 104 may be designated as priorities over other assets 104. The basis for the priority may be a business need, a core business function, current initiatives, etc. The priority of the assets 104 is generally indicated by the IT manager 116, based on input from the organization 102 (e.g., employees, managers, leaders, etc.).

In this example embodiment, based on the data captured, collected and/or received, the platform 118 is configured to generate a control maturity score for each of the controls 110 implemented in the organization 102.

In particular, the platform 118 is configured to extract indicators from the configuration files (e.g., through an API service, etc.) (technical indicators) and/or the responses from the IT manager 116 (question indicators). The indicators are representative of the maturity of the technologies 106 and/or the assets 104, for example, relative to one or more industry standards. In connection therewith, the standards may include, for example, NIST CSF 1.1, NIST 800:53, ISO 27002:2022, PCI-DSS 4.0, CIS Controls 7-8, HIPAA, or other suitable standards, etc.

The indicators may include a rating of the maturity of the controls 110, for example, between 0 and 100 (or on another suitable scale). The platform 118 is configured, then, to map the indicators to the specific controls 110. That is, the platform 118 is configured to employ a hierarchy, which is used, then, to combine the indicators, through mapping, into scores for the controls 110. Specifically, in this exemplary embodiment, the indicators may be mapped to the controls 110, by mapping the ratings/scores to specific criteria, which are in turn mapped to sub-categories. The sub-categories are then mapped to categories, by aggregating each of the aggregate ratings/scores of the sub-categories for each category. And after, the categories are mapped to controls, by aggregating each the aggregate scores/ratings of the categories to for each control. The controls 110 may then be separated or mapped into control types (e.g., preventives, detection, infrastructure, etc.).

It should be appreciated that mapping in this context includes the aggregation of the different levels of the hierarchy (e.g., ratings/scores of 10, 60, 50, 80 aggregated to 50, as an average, etc.). That is, when multiple criteria are mapped into a single sub-category, the ratings for the criteria are aggregated, such as, for example, by average, weighted average, sum, weighted sum, etc. Conversely, when only one criteria is mapped to a single sub-category, no aggregation is required. It should be appreciated that the aggregation is applied as criteria are mapped to sub-categories, sub-categories are mapped to categories, the categories are mapped to controls, etc. The aggregation of the rating may be the same, or different, at the different levels of the hierarchy. In this exemplary embodiment, the aggregation includes averaging the ratings at the layer below.

That said, as used herein, indicators define various different details about the operation, settings, configurations, etc., of the organization 102, and specific controls applied thereto. The indicators may include details related to, without limitation, virus scan tool (e.g., "virus scan detects unwanted adware?," etc.), antivirus, firewalls, encryption, penetration testing, access controls, password policies, and any other details of the organization 102 that may affect, impact or relate to access to the assets 104 of the organization 102, etc.

Based on the hierarchy, the indicators are mapped to criteria. Accordingly, to one specific example, an indicator of "antivirus can block 70% of malware" maps to the criteria of "malware prevention capabilities." Generally, an indicator will map to at least one criteria, but may map to multiple criteria (i.e., under different sub-categories, etc.). Based on the defined hierarchy for the organization 102, the criteria of "malware prevention capabilities" and, for example, a criteria for "end-point anti-malware detects unwanted programs" (and, potentially, other criteria) are then mapped into a sub-category for "malicious code is detected." The sub-category for "malicious code is detected" then maps to a category of "security continuous monitoring." This category then maps to a technical one of the controls 110 for the organization 102.

In another specific example, the indicator of "endpoint malware prevent all known malware" maps to the criteria of the same name, which maps, along with the above criteria for "malware prevention capabilities," to the sub-category of "network firewall-actual effectiveness indicators." The sub-category is mapped up to a category of the same name, which is in turn mapped, along with categories for "network firewall-design effectiveness" and "network firewall-operating effectiveness" (as an average), into a "network firewall" control. The "network firewall" control is then mapped or assigned, potentially, to the prevention type of control.

In yet another specific example, as it relates to network access for the organization 102, the exemplary control 110 includes applications secure configurations, which is related to DNS local parent mismatch as an indicator. The DNS local parent mismatch is assessed based on the criteria of DNS configuration. That assessment is included in or mapped to the application secure operating effectiveness configurations-operating effectiveness sub-category, and the application secure operating effectiveness configurations-operating effectiveness sub-category is mapped to the application secure operating effectiveness configurations-operating effectiveness category. Then, the application secure operating effectiveness configurations-operating effectiveness category is mapped to the applications secure configurations.

Further, from the above examples, it should be clear that the hierarchy is generally based on the specifics of the organization 102, as it relates to technical indicators and question indicators, and linking of the same through mapping to controls 110. As such, examples of the hierarchy herein are specific to one organization 102, and may be different in other systems embodiments. It should therefore be appreciated that various other indicators, criteria, sub-categories, categories, controls, etc., may be included in the organization 102, or hierarchy thereof, which are assessed and mapped in a similar manner to the various controls 110 consistent with the description above.

Consistent with the above, the platform 118 is configured to then average, or otherwise aggregate, the ratings from the categories of each of the controls 110 into the maturity scores for each of the controls 110, as shown, for example, shown in Table 2. In addition, the platform 118 is configured to then average or otherwise aggregate the scores/ratings from the controls 110 into maturity scores for each of the controls types, i.e., preventive, infrastructure, detective, in this example.

In one specific numeric example consistent with the above, a patch management control of the controls 110 is a practice associated with the timely application of firmware and software updates to improve functionality, close security vulnerabilities, and optimize performance. The patch management control is subject to technical validation by the platform 118 (i.e., technical indicators), and also questions submitted by the platform 118 to the IT manager 116 (i.e., question indicators). Based on the collected data, and the response from the IT manager 116, for example, the network firewall-Design effectiveness sub-category score may be calculated as 58%. The network firewall-Design effectiveness sub-category is mapped from two criteria: CQ Question criterion-1 (Is there a signature-based anti-malware tool?) and CQ Question criterion-2 (Does the endpoint anti-malware prevent all known malware?) That is, for example, to calculate the network firewall-Design effectiveness sub-category, the scores of CQ Question criterion-1 (rating of 50) and CQ Question criterion-2 (rating of 66) at the criteria level of the hierarchy are aggregated with a simple average method. The maturity score of the network firewall-Design effectiveness sub-category is expressed as (50+66)/2=58.

Table 2 illustrates a number of different controls 110 and the types of the controls 110 into which each control is organized, the maturity control score and then also a weight associated with the particular type of control. The weights may be employed, as herein, to adjust the impact of the different groups of controls, or potentially, even in some instances, the individual types of controls on the control maturity assessment.

TABLE 2

| Control Name | Control Group | Control Score | Control Weight |
|---|---|---|---|
| Network Intrusion Prevention/ Detection System | Preventive | 60 | 0.65 |
| Removable Media Control | Preventive | 36 | 0.65 |
| User Endpoint Secure Configurations | Preventive | 35 | 0.65 |
| E-mail Security | Preventive | 0 | 0.65 |
| Data-in-Transit Encryption | Preventive | 0 | 0.65 |
| Application Control and Whitelisting | Infrastructure | 60 | 0.2 |
| Asset Management | Infrastructure | 50 | 0.2 |
| Awareness and Training | Infrastructure | 27 | 0.2 |
| Brand Reputation and Protection | Detective | 20 | 0.1 |
| Network Traffic Anomalies Detection | Detective | 0 | 0.1 |
| Threat Intelligence Analysis | Detective | 8 | 0.1 |

After calculating the control maturity scores for the controls 110 and types of controls, as necessary or desired, the platform 118 is configured to assess a threat activity level, which is generally an indicator of how active different types of threat actors and/or attack methods are.

For example, certain threat actors may be prone to specific types of attack methods, while other actors may be prone to the most effective, or most recently developed attack methods, etc., as appreciated from data included in the external data structure 114. The data may include identification of attack methods relevant for certain assets, for example, based on profiles of attackers which may be identified as prone to be interested in the assets. Such attackers' profiles may be obtained or identified according to available global data and reports included in the external data structure 114. Each attacker profile may describe the attacker behavior including typical attack method, objectives, skill level of the attacker, attacker intensity, common target assets, etc.

In connection therewith, the platform 118 is configured to continuously monitor various clear, deep and dark web CTI sources, which may be extracted, received or retrieved from the data structure 112, and further to determine matches, for example, based on a single language or a multilingual dictionary, between threat actors and attack methods. The data sources may include, for example, a strategic level cyber threat trends analysis component. The matches, generally, are determined based on cyber events that include the actor and also the method, whereby each event includes one instance. In this example, the actors are generally referenced by type, while in other embodiments, the threat actors may be specific actors (e.g., an individual or a collaborative group, etc.). The platform 118 is configured to aggregate the matches, statistically, to identify threat activity level trends, propensities, etc., for each combination of threat actor and attack method and to assign a score in relation to the top activity data points from the aggregation. The threat activity level is a value between 0 and 100 and calculated as based on historical occurrences, which may be, potentially, specific to the particular industry of the organization 102, the location(s) of the organization 102, etc.

Example threat activity scores for specific matches between threat actors and attack methods are illustrated in Table 3, below. As shown, the combination of Blackhat hacker/fraudster as the actor and malware attack as the method includes a threat activity score of 97.

TABLE 3

| Attacker | Attack Method | Activity Level |
|---|---|---|
| Blackhat hacker/fraudster | Malware attacked | 97 |
| Blackhat hacker/fraudster | Ransomware Attack | 96 |
| Organized Cyber Criminal | Ransomware Attack | 93 |
| Organized Cyber Criminal | Malware attacked | 92 |
| Blackhat hacker/fraudster | Email social Engineering | 92 |

Next, in this example embodiment, the platform 118 is configured to calculate probability of success (POS) scores, for the organization 102. The probability of success scores are calculated based on a stop factor associated with the organization 102. The initial probability of success is based on a lack of the controls 110 in the organization 102, whereby the probability of success is determined to be 100%, i.e., a clear indicator of success without any control to defend against the cyber attack. It should be appreciated that the initial probability of success may be otherwise, where there are considerations beyond the maturity of the controls 110 in assessing the risk associated with one or more particular cyber attacks.

From there, in this example embodiment, the platform 118 is configured to calculate the stop factor associated with the organization 102 based on the preventive, detective and infrastructure groups of controls of the organization 102, i.e., the controls 110. The platform 118 is configured to aggregate the control scores, per group or category, from the control maturity assessment (e.g., as shown in Table 2, etc.). As such, in the example above, for the infrastructure category, the platform 118 is configured to aggregate (e.g., average, etc.), the control score for application control and whitelisting, asset management, and awareness and training (i.e., average 60, 50, and 27=~45). The platform 118 is configured, in this example, to aggregate the control scores for the other categories in the same manner. For example, the aggregate control score for preventive is ~26 (i.e., average of 60, 36, 35, 0, and 0), and the aggregate control score for detective is ~9 (i.e., average of 20, 0, and 8).

It should be appreciated that in other embodiments, the control scores may be aggregated differently, by category, or not, etc.

Next, in this example embodiment, the platform 118 is configured to combine the aggregate control scores from the different categories of controls 110, in general or based on the weights associated therewith. Continuing with the example above, the combined aggregate scores is ~27 (i.e., 26*0.65+45*0.2+9*0.1=26.8). The combined aggregate score for the organization 102 is the stop factor. The platform 118 is configured to then calculate the probability of success as the probability of a specific attack, which is based on the maturity analysis above and the threat landscape, less the stop factor of the controls 110 in place at the organization 102. For example, for a malware attack having an initial 100% chance of success, the platform 118 is configured to calculate the probability of success as 100 minus 27, or 73%.

With continued reference to FIG. 1, the platform 118 is configured to then calculate risk level (or preparedness level) of the organization 102 for each threat actor and/or each attack method considered by the threat actors, while considering malicious intent (e.g., confidentiality, availability or integrity (CIA) objectives of the actor, etc.) against the assets 104.

In connection therewith, the platform 118 is configured to determine various attack scenarios (e.g., hundreds, thousands, etc.), which are aggregated to a specific asset 104. The scenarios are based on the type of threat actor, attack method, accessibility of the actor, skill level of the actor, actor intensity or objectives, and probability of success for the specific attack method. Table 4 illustrates various attack scenarios, which are specific to the organization 102.

TABLE 4

| Risk Scenario | Attacker | Method | Objective | Asset | Priority |
|---|---|---|---|---|---|
| #1 | Disgruntled IT Employee | Denial of Service Attack | Availability | Brand Reputation & Trust | Med |
| #2 | Hacktivist | Injection attack | Confidentiality | Brand Reputation & Trust | Med |
| #3 | Disgruntled IT Employee | Injection attack | Availability | Brand Reputation & Trust | Med |
| . . . | . . . | . . . | . . . | . . . | . . . |

The scenarios included in the listing above, and others, are defined through possibilities from the threat landscape of the organization 102 (or relevant industry), as compiled through research in the threat landscape. The platform 118 is configured to determine the various attack scenarios based on assets, and asset priorities. In particular, the assets 104 and associated priorities, threat actors, attack methods and aims, along with confidentiality, integrity and availability, are matched based on the threat landscape and end users. The probable attack scenarios are taken into consideration, by the platform 118, in creating risk scenarios. It should be appreciated that the platform 118 is not configured to account for all permutations, in this example embodiment, as each threat actor is not potentially relevant on each asset and attack method.

The platform 118 is further configured to calculate the preparedness (or risk) associated with each of the assets 104*a*-*d*, shown in FIG. 1, separately. The platform 118 is configured to rely on the risk level, for each of the threat actors and each threat method, as it relates to the specific asset 104. In doing so, the platform 118 is configured to aggregate the preparedness for the attack scenarios of the assets 104, as a median or an average, based on the maturity scores of the controls 110, the threat landscape, and the threat access, which are combined to define the risk levels of each risk scenario (and which are in turn aggregated to the specific assets 104).

Table 5 illustrates the combination of the risk scores for the attackers and the risk scores for the attack methods into the risk score specific to the particular assets 104 of the organization 102, along with the priority of the assets 104 discussed above.

TABLE 5

| Business Asset | Priority | Risk Score |
|---|---|---|
| Customer protected health information | Very High | 3.57 |
| Personnel Information | Very High | 3.57 |
| Customer Financial Information | Very High | 3.57 |
| Organization Confidential business Information | Very High | 3.72 |
| Core Business Systems/Processes | High | 3.3 |
| Organization Confidential Financial Information | High | 2.24 |
| . . . | . . . | . . . |

The platform 118 is configured to then aggregate the asset scores, for the assets 104, in the environment 108, for example, into an average of the preparedness or risk scores for the specific environment 108. That is, the environments 108*a*-*b* are considered, and the specific assets 104 included in those environments 108 are aggregated (e.g., as an average, a weighted average, a mean, a sum, a maximum, etc.) into a preparedness or risk score for the specific environment 108. Similarly, the platform 118 is configured to determine the preparedness or risk score of the organization 102, which includes the preparedness or risk scores for the environments 108 included in the organization 102. The preparedness or risk score for the organization 102 may similarly be an aggregate (e.g., an average, a weighted average, a mean, a sum, a maximum, etc.) of the underlying scores. In one example, the organization preparedness or risk score is the highest preparedness score from the environments 108, i.e., the worst score in this example.

Based on the above, the preparedness scores for the assets 104, environments 108, and the organization 102, as related to specific actors and attack methods, are provided by the platform 118 to, for example, the IT manager 116.

Figure 2:
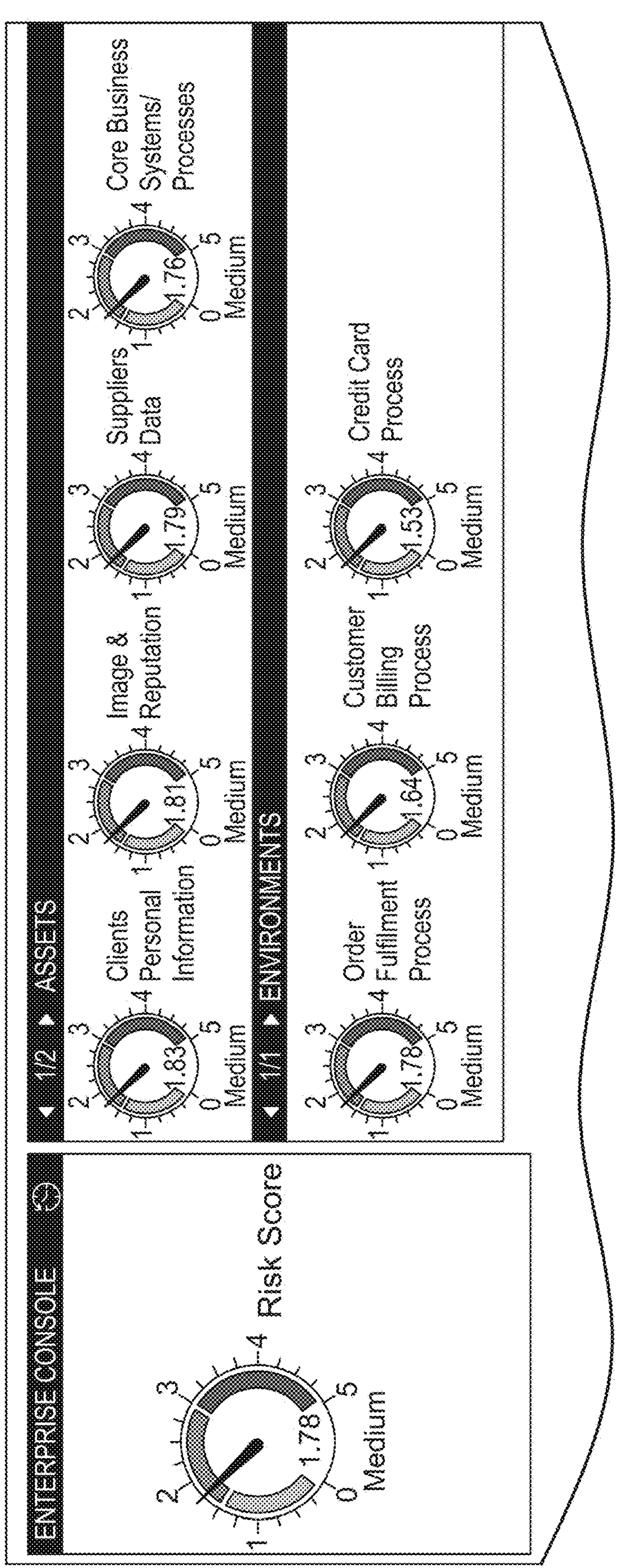
FIG. 2 illustrates an example interface, which may be displayed in the system of FIG. 1.
Figure 2:
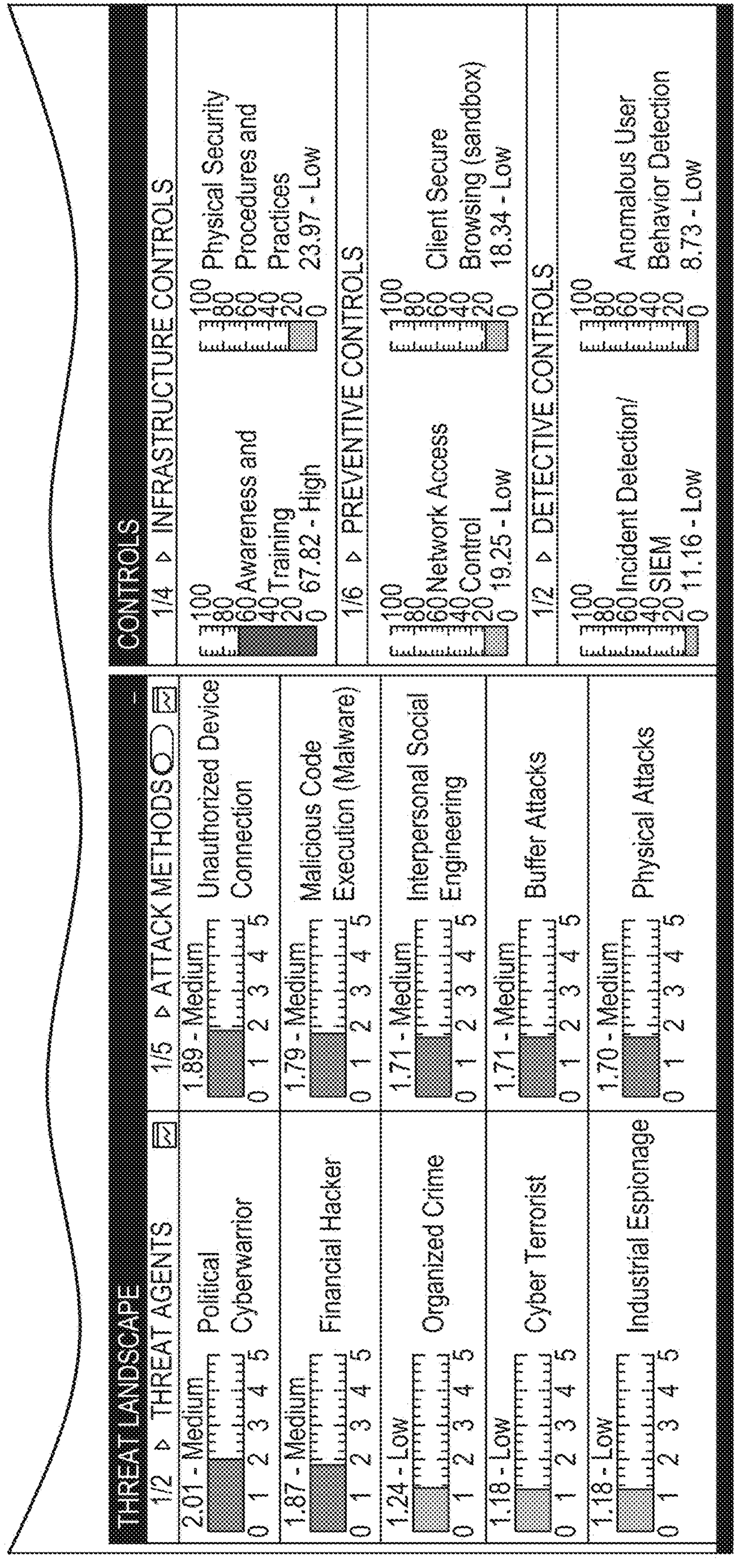

FIG. 2 illustrates an example interface 200 that may be displayed to the IT manager 116, or others, via the system 100. The interface 200 includes the preparedness or risk score of the organization 102 (e.g., "Risk score", etc.), along with the specific risk scores for the assets 104 and the environments 108. The risk scores, as determined above, are also included for specific controls 110, such as, for example, awareness and training, network access control, etc. In this way, the IT manager 116 is permitted to assess the general risk associated with the organization 102, and to work through the environments 108 of the specific assets 104, as necessary or desired.

As shown, the risk scores are represented in a variety of different manners. The risk scores for the assets 104, the environments 108, and the organization 102 are illustrated as meters, with the dials indicative of the specific scores. Each of the meters includes a narrative indicator of a risk range (e.g., Medium, etc.) depending on the risk value relative to specific ranges. Also, the risk associated with the threat agents (or attackers) and attack methods, as well as the controls, are bars, which change color and length to indicate the associated risk scores. Each of the bars is associated with a narrative indicator of a risk range (e.g., Medium, Low, High, etc.) depending on the risk value relative to specific ranges.

With reference again to FIG. 1, based on the associated risk scores, the platform 118 is configured to identify one or more of the controls 110, which may be changed or adjusted to impact the preparedness score of the assets 104, the environments 108, and/or the organization 102. For example, where a specific control includes a High risk score (e.g., the awareness and training control in FIG. 2, etc.), the platform 118 may be configured to identify the basis for the risk score and to simulate, in this manner, various control changes (e.g., dozens, hundreds, or thousands, etc.). The platform 118 is configured to organize the control changes based on the impact on the preparedness score of the assets 104, the environments 108, or the organization 102.

It should be appreciated that the various control changes may be presented in connection with the example interface 200, for example, or otherwise to inform the IT manager 116.

With continued reference to FIG. 1, the platform 118 is further configured to determine a financial impact of potential loss due to a successful cyber event.

In connection therewith, the platform 118 is configured to collect various organizational data related to the organization 102, including, without limitation, annual revenue, industry, geopolitical location, number of employees, average salary of the organization 102, etc., for example, from the data structure 112, etc. The data may be specific to locations (e.g., organizational facilities, etc.), environments 108, assets 104, etc.

In addition, the platform 118 is configured to then access one or more cost of data breach reports, from the external data structure 114. The reports may define cost in terms of locations, attack methods, etc.

Next, the platform 118 is configured to calculate a maximum financial impact for the organization 102 based on the one or more of the cost of data breach reports, annual revenue of the organization 102, geopolitical locations, and industry(ies) of the organization 102, etc. In particular, the platform 118 is configured to determine a business value, based on annual revenue of the organization 102, or portion thereof, and then, to determine, based on a formulation, the maximum financial impact value as a function of the business value. Next, the platform 118 is configured to account for the industry and geopolitical locations of the organization 102 to find maximum financial impact calculations. That is, the industry and geopolitical locations are used to find the specific impact thereto from one or more data breach reports (e.g., IBM Data Breach Report, etc.). For example, where a base value is calculated based on an annual revenue of $10 M, to be $9.5 M, the maximum impact may be calculated (based on a suitable representation of historical and/or empirical data) to be $3.4 M. Then, using the base value, and the selected industry and the location effect values related to the organization 102 and included in the data breach report, the maximum impact value is reduced to $1.8 M. The maximum input value, therefore, in this example, is dependent on annual revenue and the industry (ies) and location(s) of the organization 102.

The platform 118 is also configured to calculate a minimum financial impact of the organization 102. In particular, the platform 118 is configured to calculate the minimum financial impact, based on the maximum financial impact and the formula where the maximum financial impact is divided by a constant, which are based on historical data and/or empirical input. The constant may be included in a suitable range, for example, above zero, from thirty to seventy, from fifty to sixty, or other suitable range of constants, or at specific values such as, for example, 30, 70, 150, etc., based on the above indicated data. It should be appreciated that the constant may be changed or altered based on the historical data distributions associated, potentially, with historical breaches, data breach reports, etc. In one example, where the maximum financial impact is $100B (USD) and the constant is identified as 60, the platform 118 is configured to calculate the minimum financial impact as $100B/60, or $1.67B. The platform 118 is configured to then divide or split the maximum and minimum financial impact among the different assets 104 of the organization 102, consistent with the priorities of the assets 104 and associated confidentiality, integrity, and availability parameters. That is, the platform 118 is configured to evaluate each of the assets 104 in connection with confidentiality, integrity and availability (CIA) parameters (e.g., as defined in TABLE 4, etc.). Each parameter is given in a percentage for each asset 104. Each asset 104, then, is associated with a distribution for confidentiality, integrity and availability. The platform 118 is configured to split the maximum and minimum impact values with these distributions to each asset 104 (e.g., PII, PHI, IP, etc.) with its priorities to find lowest, medium and highest financial impact values.

Specifically, in order to split the minimum and maximum values, the platform 118 is configured to calculate, for each asset 104, the financial value under confidentiality, integrity and availability (CIA) parameters for low, medium and high financial impact values, based on assigned importance levels and the priorities of each business asset 104 are used. As shown in Table 6, for example, to find minimum score (low) for each business asset, minimum financial value from above is combined with associated percentage of each parameter, priorities of each business asset, and some constants like user coefficients with mathematical calculations and normalizations to split total maximum score. Maximum score (high) for each business asset, maximum financial value above is combined with associated percentage of each parameter, priorities of each business asset, and some constants like user coefficients with mathematical calculations and normalizations to split total maximum score. Medium financial impact score is found by lowest and highest score with a formulation. Medium financial impact score is between highest and lowest score. An example of the results are seen in Table 6, where the result are specific to the agreements and contracts business asset 104.

TABLE 6

| | Confidentiality | | | Integrity | | | Availability | | |
|---|---|---|---|---|---|---|---|---|---|
| Business Assets | Low | Med. | High | Low | Med. | High | Low | Med. | High |
| Agreements and Contracts | $3.1 | $4.5 | $11.1 | $1.45 | $5.2 | $8.2 | $2 | $5.1 | $7 |

Then, the platform 118 is configured to calculate, for each asset 104, the financial value under confidentiality, integrity and availability (CIA) for low, medium and high financial impact values. The platform 118 is configured to combine and aggregate cyber risk scores and financial impact values with lowest, highest and expected (medium) for each business asset.

Figure 5:
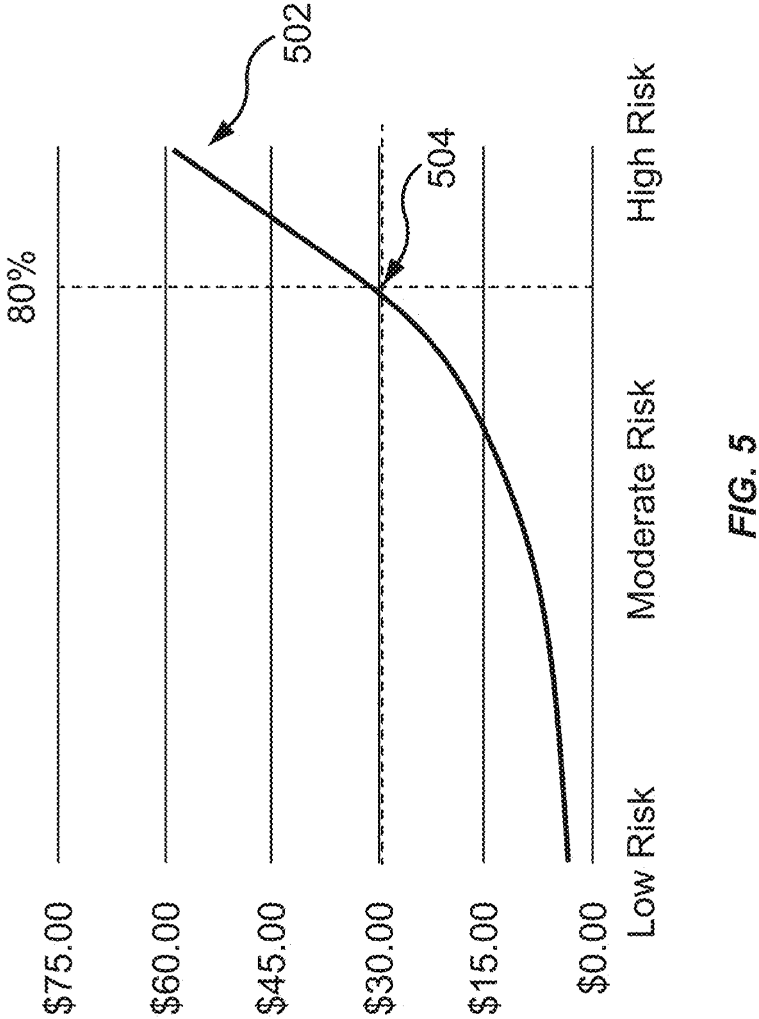
FIG. 5 illustrates an example identification of a financial impact defined by a curve indicative of a relationship between the financial impact and risk associated with asset(s).

In connection therewith, FIG. 5 illustrates an example financial impact curve, which defines a relationship between financial impact and risk to a specific asset, such as, for example, PII information asset 104. In this example, the low, medium and high values for the confidentiality parameter (similar to what is in Table 6 above) are 4.1, 9.0 and 13.3, respectively. The values are aligned with a risk level of low to high, or 0 to 5, in this example embodiment, and a curve indicative of risk values versus financial impact values. An example curve is illustrated at reference 502, and the intersection point for an asset specific cyber risk score of 4 (on the X-axis scale from 0-5) (e.g., at 80%, etc.) is provided as an incept point 504 at a total financial impact of the specific assets as $30 M.

The platform 118 is configured to then calculate cyber risk scores and financial impact for the environments 108, and the organization 102, separately. In particular, the platform 118 is configured to average the asset scores for the assets 104 included within the environment 108. So, for example, with reference to FIG. 1, the cyber risk scores for the assets 104*a-b* are averaged to provide the cyber risk score for the environment 108*a*. The cyber risk scores for the environments 108 may further be averaged to provide the cyber risk score for the organization 102. Alternatively, in this example embodiment, the platform 118 is configured to compare the cyber risk scores for the different environments 108 and to select the highest, biggest cyber risk score as the cyber risk score for the organization 102. It should be appreciated, however, that the cyber risk scores may be aggregated up to the environments 108 and then to the organization 102 in any suitable manner, depending, potentially, for example, on decisions to be made, particular assets/environments, industries, locations, specific cyber attacks, etc.

Based on the above, the platform 118 is configured to generate at least one interface, which includes one or more of the scores for the organization 102, the environments 108, and/or the assets 104. In this way, the specific risks associated with cyber attacks are presented as specific dollar values, i.e., financial impact, as compared to numeric scores untied to specific financial impact.

Figure 3:
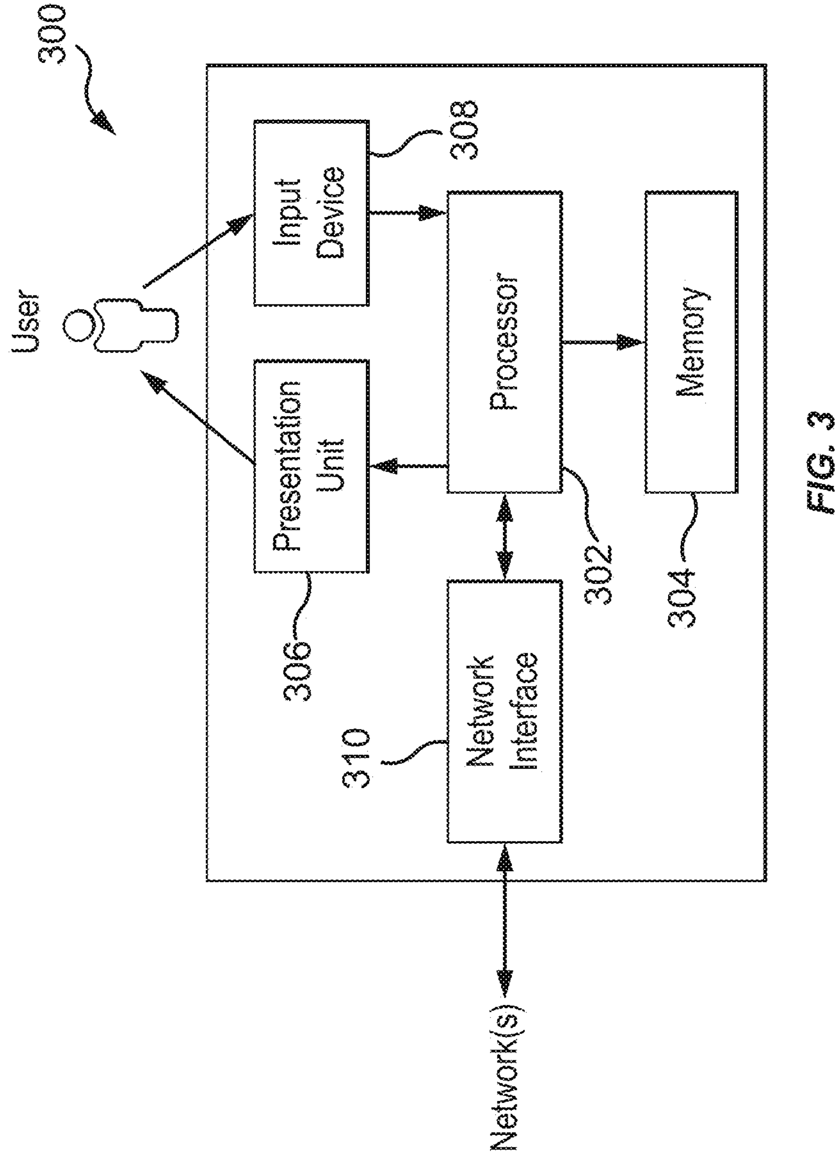
FIG. 3 is a block diagram of an example computing device, that may be used in the system of FIG. 1.

FIG. 3 illustrates an example computing device 300 that can be used in the system 100 of FIG. 1. The computing device 300 may include, for example, one or more servers, workstations, personal computers, laptops, tablets, smartphones, etc. In addition, the computing device 300 may include a single computing device, or it may include multiple computing devices located in close proximity or distributed over a geographic region, so long as the computing devices are specifically configured to function as described herein. In the example embodiment of FIG. 1, the data structures 112, 114 and the platform 118 each may be included in (and/or may include) and/or may each be implemented in a computing device, consistent with and/or similar to the computing device 300, coupled to (and in communication with) one or more networks. It should be further appreciated that the assets 104, technologies 106 and the controls 110 are integrated into and may be considered computing devices, etc., whereby each is again consistent with the computing device 300. However, the system 100 should not be considered to be limited to the computing device 300, as described below, as different computing devices and/or arrangements of computing devices may be used in other embodiments. In addition, different components and/or arrangements of components may be used in other computing devices.

Referring to FIG. 3, the example computing device 300 includes a processor 302 and a memory 304 coupled to (and in communication with) the processor 302. The processor 302 may include one or more processing units (e.g., in a multi-core configuration, etc.). For example, the processor 302 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 304, as described herein, is one or more devices that permit data, instructions, etc., to be stored therein and retrieved therefrom. The memory 304 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 304 may be configured to store, without limitation, risk scores, questionnaires, configuration files, annual revenue, reports, and/or other types of data (and/or data structures) suitable for use as described herein. Furthermore, in various embodiments, computer-executable instructions may be stored in the memory 304 for execution by the processor 302 to cause the processor 302 to perform one or more of the operations described herein (e.g., one or more of the operations described herein), such that the memory 304 is a physical, tangible, and non-transitory computer readable storage media. Such instructions often improve the efficiencies and/or performance of the processor 302 and/or other computer system components configured to perform one or more of the various operations herein, whereby the instructions effectively transform the computing device 300 into a special purpose device configured to perform the unique and specific operations described herein. It should be appreciated that the memory 304 may include a variety of different memories, each implemented in one or more of the operations or processes described herein.

In the example embodiment, the computing device 300 also includes a presentation unit 306 that is coupled to (and is in communication with) the processor 302 (however, it should be appreciated that the computing device 300 could include output devices other than the presentation unit 306, etc.). The presentation unit 306 outputs data (e.g., preparedness scores, threat levels, as shown in interface 200, etc.), visually or audibly, for example, to a user of the computing device 300, etc. And, various interfaces (e.g., as defined by one or more websites, applications, etc.) may be displayed at computing device 300, and in particular at presentation unit 306, to display certain information to the user of the device. The presentation unit 306 may include, without limitation, a liquid crystal display (LCD), a light-emitting diode (LED) display, an organic LED (OLED) display, an "electronic ink" display, speakers, etc. In some embodiments, presentation unit 306 may include multiple devices.

In addition, the computing device 300 includes an input device 308 that receives inputs from the user (i.e., user inputs) of the computing device 300 such as, for example, questionnaire/survey response related to controls for different assets, as further described herein. The input device 308 may include a single input device or multiple input devices. The input device 308 is coupled to (and is in communication with) the processor 302 and may include, for example, one or more of a keyboard, a pointing device, a mouse, a camera, a touch sensitive panel (e.g., a touch pad or a touch screen, etc.), another computing device, and/or an audio input device. In various example embodiments, a touch screen, such as that included in a tablet, a smartphone, or similar device, may behave as both the presentation unit 306 and an input device 308.

Further, the illustrated computing device 300 also includes a network interface 310 coupled to (and in communication with) the processor 302 and the memory 304. The network interface 310 may include, without limitation, a wired network adapter, a wireless network adapter, or other device capable of communicating to one or more different ones of the networks herein and/or with other devices described herein. In some example embodiments, the computing device 300 may include at least one processor (e.g., the processor 302, etc.), at least one memory (e.g., the memory 304, etc.), and/or one or more network interfaces (e.g., network interface 310, etc.) included in, or incorporated into or with the at least one processor.

Figure 4:
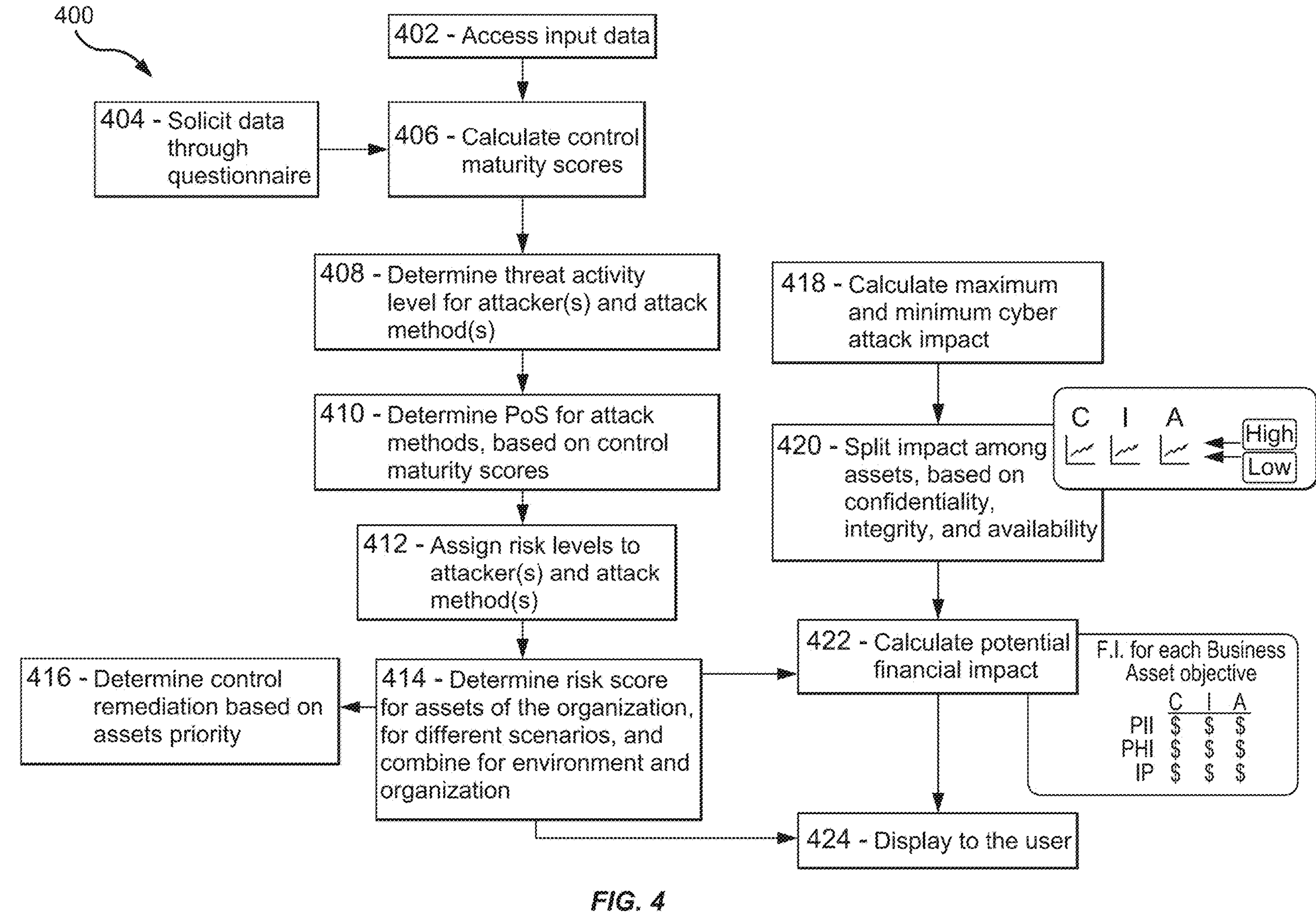
FIG. 4 is an example method for assessing cyber attack preparedness associated with organizations, which may be implemented in the system of FIG. 1.

FIG. 4 illustrates an example method 400 for assigning a preparedness or risk score to an organization, and its assets and/or environments. The example method 400 is described as implemented in the platform 118 of the system 100, and with additional reference to the computing device 300. The methods herein should not be understood to be limited to the example system 100 or the example computing device 300, and likewise, the systems and the computing devices herein should not be understood to be limited to the example method 400.

Initially, in response to one or more intervals, or a threat review or audit, the method 400 is initiated. That is, the user 116 may provide a request to the platform 118, where the request indicated the scope of the assessment, for example, the organization 102 or a subset thereof.

In response, at 402, the platform 118 accesses data required for the assessment of the organization 102 (or subset thereof). The data, as explained above, may include configuration files for the assets 104 and technologies 106 of the organization 102, revenues of the organization 102 (e.g., annual, monthly, etc.), industries of the organization 102, locations/facilities of the organization 102, employee information (e.g., number of employees, organization charts, work locations of employees, salary of employees, etc.), etc. The data may further include reporting data related to cyber attacks, where the reporting data includes cyber attack events and associated timing, targets, methodologies, actors and objectives, and also analytics related to the same.

It should be appreciated that the data may further include a framework of indicators, criteria, sub-categories, categories and controls, where the data is related to any part of all of the same.

In addition, at 404, the platform 118 solicits data through one or more questionaries to the user 116. The questionaries may be specific to assets 104, technologies 106 and/or the applicable controls 110. Different examples of questions included therein are provided above, including, for example; "To what extent is employees' internet browsing secure against web-related threats?" In response, the user 116 proceeds through the one or more questionaries (i.e., each have one or more questions related to specific criteria, indicators, or even control, etc.) and responds with appropriate, responsive data specific to the organization 102. The platform 118, in turn, receives the data.

It should be appreciated that the data is accessed through steps 402 and 404 above, at the outset, but the data may also be accessed later in the method 400, as necessary or desired. For example, revenue data may be accessed, by the platform 118, in connection with step 418, for example. What's more, between the manual entry of data by the user 116 through the questionnaire, and the access of data, the platform 118 is enabled with the data necessary for the computations and calculations described herein.

As shown in FIG. 4, the platform 118 proceeds to calculate the control maturity score, at 406. In particular, as explained above, the platform 118 initially determines the quantitative scores for each indicator. The scores are determined, in this example, on a range from 0 to 100. The scores are determined from both the accessed data (e.g., which is machine accessed, etc.) and also the manually entered data from the user 116, as explained above.

Next, the platform 118 calculates the average scores for the indicators that map to a specific criteria for assessing the organization 102 (e.g., DNS configuration, etc.). The average scores for each of the criteria are then averaged according to the sub-categories to which the criteria are mapped. Next, the scores for the sub-categories are averaged, based on the category to which each sub-category is mapped. The scores provide category specific maturity levels. The category scores are then averaged, again, consistent with a mapping of the categories to specific ones of the controls 110.

The scores for the controls 110 may be further combined based on control type: preventive, infrastructure, and detective in this example embodiment. It should be appreciated that the controls 110 may be organized by type, or otherwise, in other embodiments.

Through the above sequence, as defined by the indicators to control hierarchy explained above, the platform 118 calculates the control maturity score (for the different controls 110) based on the accessed data.

At 408, the platform 118 determines the threat activity level/scores for attacker(s) (or actor(s) and attack method(s). Specifically, as explained above, certain threat actors may be prone to specific types of attack methods, while other actors may be prone to the most effective, or most recently developed attack methods, etc., as appreciated from data. The platform 118 continuously or otherwise monitors the data and further determines matches, for example, based on a single language or a multilingual dictionary, between threat actors and attack methods. The matches, generally, are determined based on cyber events that include the actor and also the method, whereby each event includes one instance. The platform 118 aggregates the matches, statistically, to identify threat activity level trends, propensities, etc., for each combination of threat actor and attack method and to assign a score in relation to the top activity data points from the aggregation.

In this example embodiment, consistent with the above, the threat activity level is a value between 0 and 100 and calculated as based on historical occurrences, which may be, potentially, specific to the particular industry of the organization 102, the location(s) of the organization 102, etc.

At 410, the platform 118 determines the POS for the attack methods, based, at least in part, on the control maturity score. The POS or probability of success scores are calculated based on a stop factor associated with the organization 102, as explained above, where the POS is calculated based on multiple correlations between threat actors and attached methods, and the controls 110 implemented in the organization 102, considering actual effectiveness level.

At 412, the platform 118 assigns a risk level (or preparedness level) to the organization 102 for each threat actor and/or each attack method considered by the threat actors, while considering malicious intent (e.g., confidentiality, availability or integrity (CIA) objectives of the actor, etc.) against the assets 104.

At 414, the platform 118 determines a risk score for the assets 104 of the organization 102 for different scenarios, based on the risk level, for each of the threat actors and each threat method, as it relates to the specific asset 104. In doing so, the platform 118 is configured to aggregate the preparedness of the attack scenarios of the assets 104, as a median above average.

The platform 118 is configured to then aggregate the asset scores, for the assets 104, in the environment 108, for example, into an average of the preparedness or risk scores for the specific environment 108. That is, the environments 108*a-b* are considered, and the specific assets 104 included in those environments 108 are aggregated (e.g., as an average, a weighted average, a mean, a sum, a maximum, etc.) into a preparedness or risk score for the specific environment 108. Similarly, the platform 118 is configured to determine the preparedness or risk score of the organization 102, which includes the preparedness or risk scores for the environments 108 included in the organization 102. The preparedness or risk score for the organization 102 may similarly be an aggregate (e.g., an average, a weighted average, a mean, a sum, a maximum, etc.) of the underlying scores. In one example, the organization preparedness or risk score is the highest preparedness score from the environments 108, i.e., the worst score in this example.

Based on the above, the preparedness scores for the assets 104, environments 108, and the organization 102, as related to specific actors and attack methods, are provided by the platform 118 to, for example, for presentation or display to the IT manager 116 (e.g., at step 424, etc.).

At 416, the platform 118 is configured to determine control remediation based on the assets 104 priorities. That is, the risk score(s) for the organization 102, the environments 108, the technologies 106 and the assets 104, may be decompiled, based on the hierarchy of the organization 102 to determine which indicators (or categories or sub-categories, etc.) impact the risk scores. In doing so, the platform 118 is able to assess the ratings/score of the indicator, criteria, sub-category, category, etc., to identify one or more controls or details thereof to be modified, in a manner intended to remediate the risk score/rating associated therewith. The platform 118 may simulate various changes to the indicators, which, in turn, are factored into recalculation consistent with steps 406-414, whereby an improvement for one or more remediations may be determined for presentation or display to the IT manager 116 (e.g., at step 424, etc.).

With continued reference to FIG. 4, the platform 118 also collects various data associated with financial impact of a cyber attack on the organization 102. The data includes organization data, such as, without limitation, annual revenue, industry, geopolitical location, number of employees, average salary (e.g. from the data structure 112, etc.) and also data breach reports (e.g., from the external data structure 114, etc.).

Next, at 418, the platform 118 calculates a maximum financial impact for the organization 102 based on the one or more of the cost of data breach reports, annual revenue of the organization 102, geopolitical locations, and industry(ies) of the organization 102, etc. The platform 118 also calculates, at 418, a minimum financial impact of the organization 102, based on the maximum financial impact and the formula where the maximum financial impact is divided by a constant. At 420, the platform splits the financial impact (e.g., maximum and minimum, separately, etc.) among the different assets 104 of the organization 102, consistent with the priorities of the assets 104 and associated confidentiality, integrity, and availability. As shown in FIG. 4, the financial impact, both high (maximum) and low (minimum) are split to the different categories of assets 104. Next, as shown in FIG. 4, at 422, the platform 118 calculates, for each asset 104, the financial value under confidentiality, integrity and availability categories for low, medium and high financial impact values, based on the cyber risk scores for the specific assets 104.

Based on the above, the platform 118 generates and displays, at 424, one or more interfaces, which includes one or more of the scores for the organization 102, the environments 108, and/or the assets 104. In this way, the specific risks associated with cyber attacks are presented as specific dollar values, i.e., financial impact, as compared to numeric scores untied to specific financial impact. An example interface, as explained above, is illustrated in FIG. 2.

In view of the above, the systems and methods herein provide for modeling preparedness (e.g., of organizations, etc.) for cyber attacks, and potentially, the financial losses associated with the cyber attacks. The modeling relies on identifying a threat landscape, cyber maturity status, and information assets. In this manner, the systems and methods provide for an objectives measure of the preparedness or risk of an organization, where control maturity risk is comprehensives if its assessment, and then financial impact is calculated as a mechanism to educate decision makers associated with remediation of the organization 102 (e.g., in efforts to further secure the information assets 104, etc.).

In this way, the systems and methods herein may provide quantitative evaluations about maturity of controls with enhanced objectivity as based on clear standards, ratings, scores, etc., and further, may provide up-to-date control maturity information based on the automation and/or data accessed (e.g., technical indicators, question indicators, etc.).

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the claimed operations.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "coupled to," "associated with," or "included with" another element or layer, it may be directly on, engaged, connected or coupled to, or associated with the other element or layer, or intervening elements or layers may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in assessing cyber attack preparedness associated with an organization, the method comprising:

accessing data indicative of multiple controls of an organization, the organization including an information network, which includes the controls, the controls associated with securing one or more information assets, the data indicative of the controls including multiple indicators;

wherein accessing the data includes prompting, by a computing device, a first user to respond to one or more questions specific to policies associated with the information assets and receiving, by the computing device, at least a portion of the data from the first user, in response to the one or more questions;

aggregating, by the computing device, one or more ratings, based on the data, for at least one of the indicators to a criteria;

aggregating, by the computing device, the aggregate rating for the criteria to a category;

aggregating, by the computing device, for each group of the controls, the aggregate rating for the category to the group of the controls as a control maturity score;

determining, by the computing device, for each of the groups of the controls, a stop factor for the organization;

determining, by the computing device, a probability of success for an attack, for each of the groups of controls, based on the control maturity scores and the stop factor;

determining, by the computing device, based on the probabilities of success, a risk score for the one or more information assets of the organization;

displaying, by the computing device, an aggregate risk score for the organization, based on the risk score(s) for the one or more information assets of the organization; and determining, by the computing device, and implementing a control remediation, which includes modifying one of the controls, based on a priority associated with one of the one or more information assets and the risk score for said one of the one or more information assets.

2. The computer-implemented method of claim 1, wherein the information assets include personal identifying information (PII), protected health information (PHI) and customer financial information.

3. The computer-implemented method of claim 1, wherein accessing the data further includes accessing one or more configuration files included in the information network; and wherein the one or more configuration files includes one or more of the multiple indicators.

4. The computer-implemented method of claim 1, wherein the one or more questions relate to at least one of an antivirus software and an anti-malware software.

5. The computer-implemented method of claim 1, wherein aggregating the aggregate rating for the criteria includes:

aggregating the aggregate rating for the criteria with other aggregate ratings for a criteria specific to a sub-category of the category; and then, aggregating the aggregate rating specific to the sub-category with other aggregate ratings for sub-categories specific to the category.

6. The computer-implemented method of claim 1, wherein aggregating one or more ratings for at least one of the indicators includes averaging the one or more ratings for at least one of the indicators.

7. The computer-implemented method of claim 1, further comprising combining the control maturity score with one or more other control maturity scores, based on a type of said one of the controls.

8. The computer-implemented method of claim 1, further comprising:

calculating a financial impact for cyber attack for each of the one or more information assets, based on revenue of the organization; and displaying, by the computing device, the financial impact relative to one or more of the risk score(s).

9. A system for use in assessing cyber attack preparedness associated with an organization, the system comprising at least one computing device, which includes a memory and a processor, the processor configured to:

access data indicative of multiple controls of an organization, the organization including an information network, which includes the controls, the controls associated with securing one or more information assets, the data indicative of the controls including multiple indicators;

wherein the processor is configured, in accessing the data, to prompt a first user to respond to one or more questions specific to policies associated with the information assets and receive at least a portion of the data from the first user, in response to the one or more questions;

aggregate one or more ratings, based on the data, for at least one of the indicators to a criteria;

aggregate the aggregate rating for the criteria to a category;

aggregate for each group of the controls, the aggregate rating for the category to the group of the controls as a control maturity score;

determine, for each of the groups of the controls, a stop factor for the organization;

determine a probability of success for an attack, for each of the groups of controls, based on the control maturity scores and the stop factor;

determine, based on the probabilities of success, a risk score for the one or more information assets of the organization;

display an aggregate risk score for the organization based on the risk score(s) for the one or more information assets of the organization; and implement a control remediation, which includes modifying one of the controls, based on a priority associated with one of the one or more information assets and the risk score for said one of the one or more information assets.

10. The system of claim 9, wherein the processor is configured, in order to access the data, to access one or more configuration files included in the information network; and wherein the one or more configuration files includes one or more of the multiple indicators.

11. The system of claim 9, wherein the processor is configured, in order to aggregate the aggregate rating for the criteria, to:

aggregate the aggregate rating for the criteria with other aggregate ratings for a criteria specific to a sub-category of the category; and then, aggregate the aggregate rating specific to the sub-category with other aggregate ratings for sub-categories specific to the category.

12. The system of claim 9, wherein the processor is further configured to combine the control maturity score with one or more other control maturity scores, based on a type of said one of the controls.

13. The system of claim 9, wherein the processor is further configured to:

calculate a financial impact for cyber attack for each of the one or more information assets based on revenue of the organization; and display the financial impact relative to one or more of the risk score(s).

14. A non-transitory computer-readable storage medium comprising executable instructions for use in assessing cyber attack preparedness associated with an organization, which when executed by at least one processor, cause the at least one processor to:

access data indicative of multiple controls of an organization, the organization including an information network, which includes the controls, the controls associated with securing one or more information assets, the data indicative of the controls including multiple indicators;

wherein the at least one computing device is configured, in accessing the data, to prompt a first user to respond to one or more questions specific to policies associated with the information assets and receive at least a portion of the data from the first user, in response to the one or more questions;

aggregate one or more ratings, based on the data, for at least one of the indicators to a criteria;

aggregate the aggregate rating for the criteria to a category;

aggregate for each group of the controls, the aggregate rating for the category to the group of the controls as a control maturity score;

determine, for each of the groups of the controls, a stop factor for the organization;

determine a probability of success for an attack, for each of the groups of controls, based on the control maturity scores and the stop factor;

determine, based on the probabilities of success, a risk score for the one or more information assets of the organization;

display an aggregate risk score for the organization based on the risk score(s) for the one or more information assets of the organization; and implement a control remediation, which includes modifying one of the controls, based on a priority associated with one of the one or more information assets and the risk score for said one of the one or more information assets.

15. The non-transitory computer-readable storage medium of claim 14, wherein the executable instructions, when executed by the at least one processor to access the data, cause the at least one processor to access one or more configuration files included in the information network; and wherein the one or more configuration files includes one or more of the multiple indicators.

16. The non-transitory computer-readable storage medium of claim 14, wherein the executable instructions, when executed by the at least one processor to aggregate the aggregate rating for the criteria, cause the at least one processor to:

aggregate the aggregate rating for the criteria with other aggregate ratings for a criteria specific to a sub-category of the category; and then, aggregate the aggregate rating specific to the sub-category with other aggregate ratings for sub-categories specific to the category.

17. The non-transitory computer-readable storage medium of claim 14, wherein the executable instructions, when executed by the at least one processor, cause the at least one processor to:

calculate a financial impact for cyber attack for each of the one or more information assets, based on revenue of the organization; and display the financial impact relative to one or more of the risk score(s).

* * * * *